June 11, 1957 R. D. DIMOND 2,795,138
GAS METERS
Filed Oct. 20, 1953 2 Sheets-Sheet 1
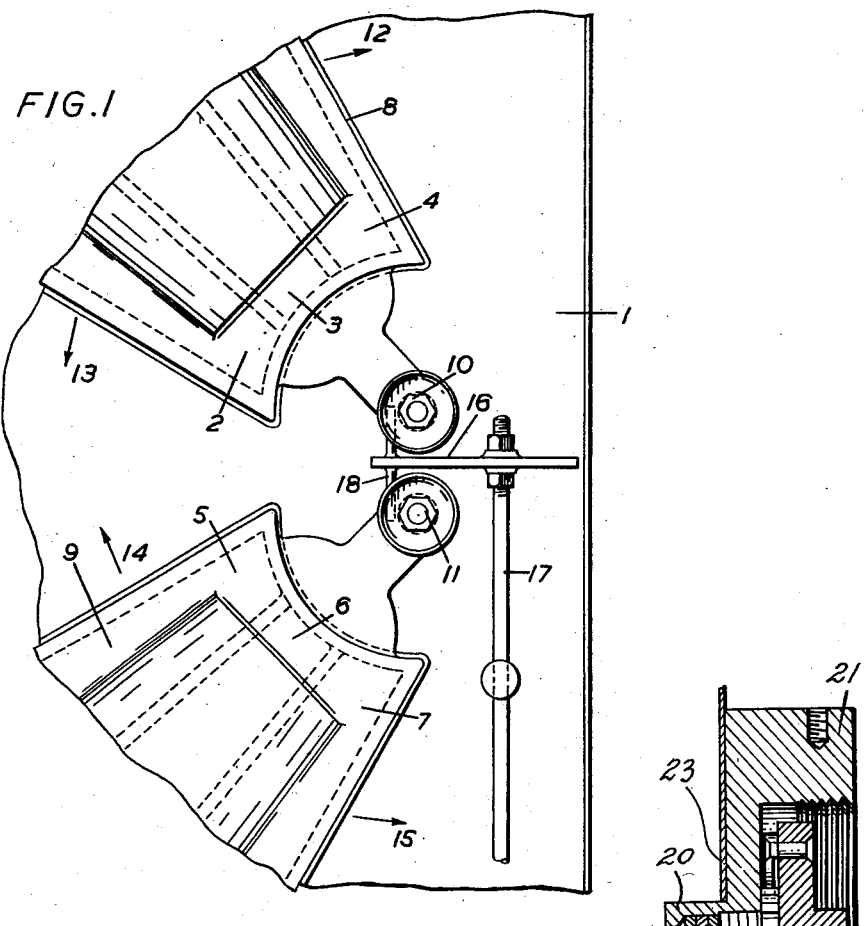
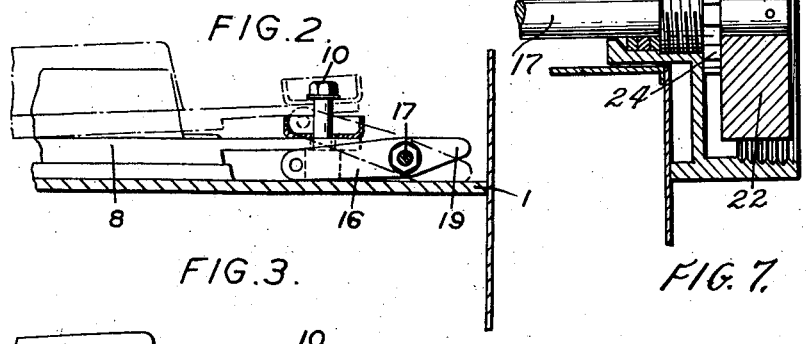
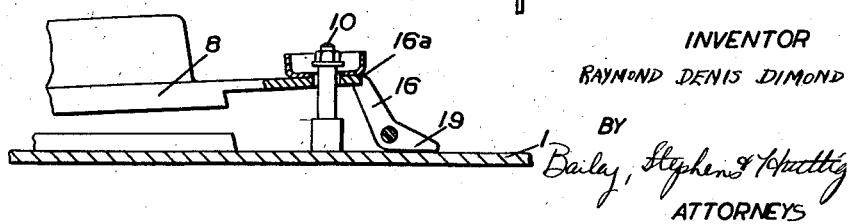
INVENTOR
RAYMOND DENIS DIMOND
BY
Bailey, Stephens & Huettig
ATTORNEYS June 11, 1957  R. D. DIMOND  2,795,138
GAS METERS
Filed Oct. 20, 1953  2 Sheets-Sheet 2
FIG. 4.
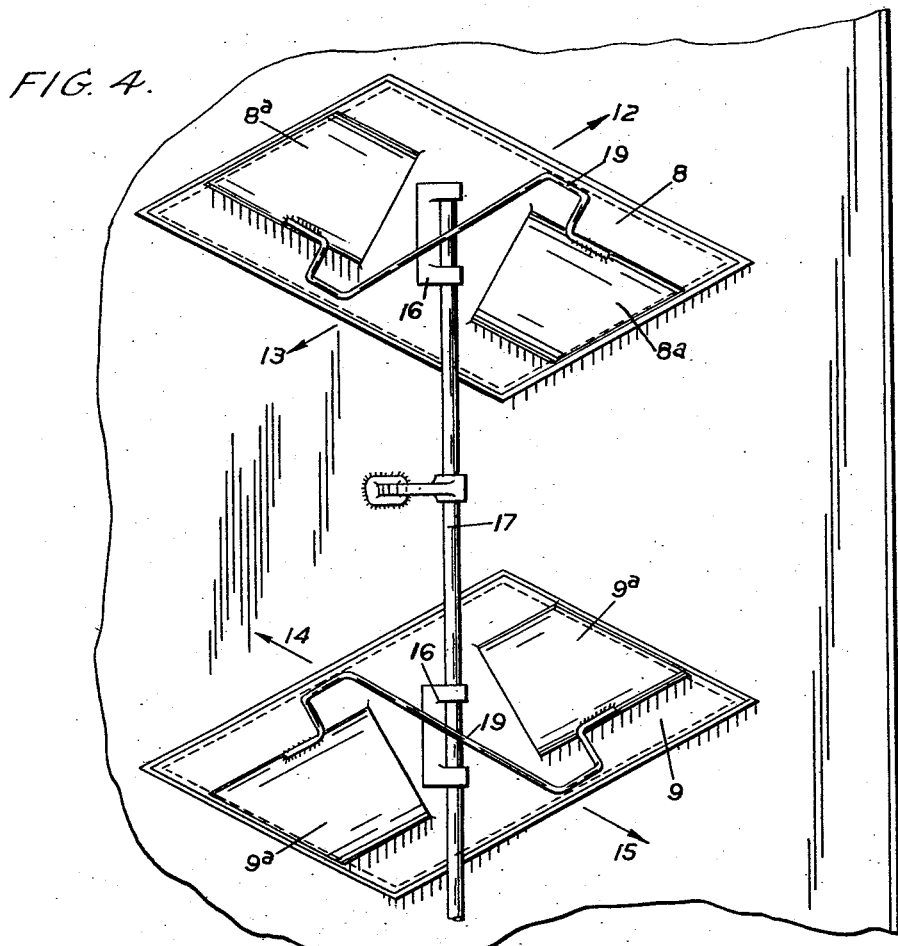
FIG. 6.
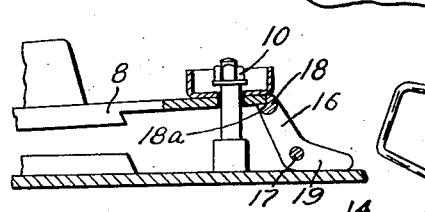
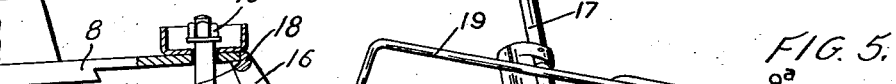
FIG. 5.
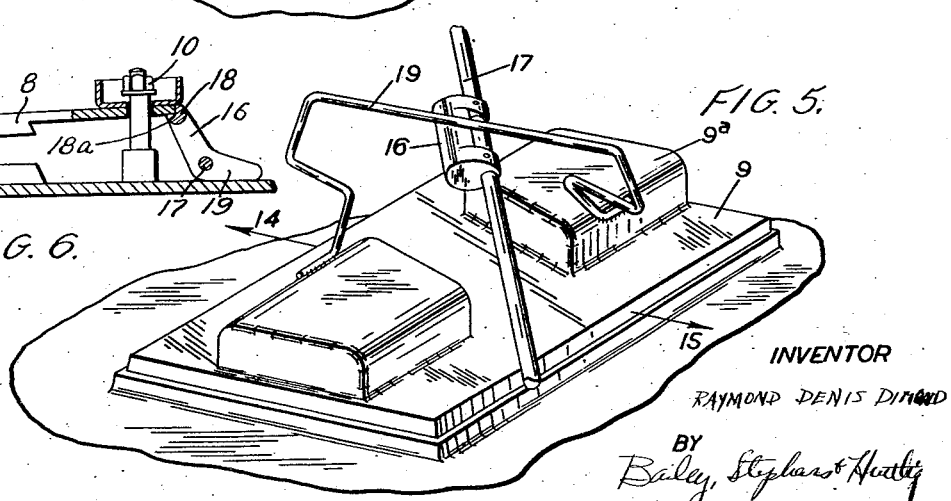
INVENTOR
RAYMOND DENIS DIMOND
BY
Bailey, Stephens & Huettig
ATTORNEYS

United States Patent Office 2,795,138
Patented June 11, 1957

2,795,138

GAS METERS

Raymond Denis Dimond, Chalfont St. Peter, England, assignor to North Thames Gas Board, London, England, a British body corporate Application October 20, 1953, Serial No. 387,270

5 Claims. (Cl. 73—262)

The invention relates to gas meters of the dry type, such meters normally comprising a plurality of expansible metering chambers which are alternately expanded and collapsed under the control of valves each valve connecting an associated chamber firstly to the gas inlet on the meter and then to the gas outlet, the expansible chambers being connected to the meter index through a gear train. With such meters when the gas supply is for industrial purposes or for essential services it is frequently deemed necessary to associate with the meter installation a by pass pipe external to the meter, the by pass pipe being controlled by a stop cock which is normally shut and sealed, isolation valves being located at each side of the meter. In the event of a failure in the meter the seal is broken, the isolation valve shut at each side of the meter and the by pass stop cock opened. The consumer accordingly receives unmetered gas until it is possible to replace or repair the meter.

The present invention provides a meter with an internal by pass and so obviates the need for an external by pass pipe and stock cock, and also obviates the need for an isolation valve on the outlet side of the meter. It provides a simpler and more self-contained installation and may be constructed to minimise the risk of fraudulent use of the by pass.

In accordance with the invention a dry type gas meter with sliding valves is provided with external means for displacing the displaceable members of the valves, in such a manner that the outlet ports of the valves are brought into direct communication with the meter inlet so that gas may pass from the meter inlet to the outlet ports wihout passing through the metering chamber or chambers. The means may conveniently comprise one or more cams or cam actuated element for lifting the sliding elements of the valves.

With such an arrangement it may be convenient to provide the cam surface or the surface of a cam actuated lifting element with a notch into which the sliding element of the valve drops when the element is lifted, so that the valve cannot be returned to the normal position without dismantling the meter, at least partly. Alternatively if desired the actuating shaft for the cam may be provided with a locking device.

The invention is illustrated in the accompanying drawings in which Fig. 1 shows a fragmentary plan view of an industrial dry type gas meter in accordance with the invention, the top plate of the external casing being broken away. Fig. 2 is a fragmentary vertical section of the lifting arrangement shown in Fig. 1. Fig. 3 is a fragmentary vertical section of a modification. Fig. 4 is a fragmentary top plan view of a meter having a different type, of valve and valve lifting mechanism. Fig. 5 is a fragmentary perspective view of the arrangement shown in Fig. 4. Fig. 6 is a detail view of a modified form of cam lock, and Fig. 7 is a cross-sectional view through the cam shaft operating mechanism.

Referring first to Figs. 1 and 2 the meter illustrated is a conventional dry type industrial meter having a top ported plate 1 within the casing. The mains inlet which is not shown in the drawings is located above the plate 1 and the outlet to the service is located below the plate 1. The ports 2, 3, 4 and 5, 6, 7 in the plate 1 are arranged in groups of three, the outer ports 2, 4 and 5, 7 of each group communicating with an expansible meter chamber constituted by bellows (not shown) and the centre port 3 or 6 communicating with the meter outlet. The sliding elements of the valve are caps 8, 9 pivoted at 10, and each having an internal passage (not shown) so that the centre port 3 or 6 of each group of ports may be caused to communicate with either of the outer ports of that group. Each cap 8, 9 undergoes during operation a sliding reciprocating semi-rotary movement in the direction of the arrows 12, 13, 14, 15.

The meter is of conventional type and the internal meter chambers are not illustrated, since the construction of the meter, except for the parts illustrated does not depart from conventional practice. The sequence of operation of the valves is as follows. Assuming first that the cap 8 moves to the right so as to expose the port 2, the associated metering chamber fills and thereby rotates a crankshaft (not shown) which causes both caps 8 and 9 to move. The cap 8 then moves to the left so that its internal passage permits the full metering chamber to collapse, discharging its contents through the port 2 and the internal passage in the cap 8 into the common exhaust port 3 and thence to the meter outlet whilst the other port 4 is exposed so that gas from the mains is permitted to fill the associated metering chamber. The same sequence of operations takes place with the other cap 9 and the associated ports 5, 6, 7. The movement of the crankshaft is transmitted to a recording device in known manner.

In the form of invention illustrated in Figs. 1 and 2 a cam 16 mounted upon a shaft 17 and actuated by a key or wheel from a locked or sealed compartment outside the meter carries a cross shaft 18 which engages under the caps 8, 9 of the valves near the pivots 10, 11. The mounting of each valve on its pivot comprises a pillar nut which permits the valves to be raised or lowered by the cam.

When it is desired to by-pass the meter the camshaft 17 is rotated so as to raise the valves 8, 9, thus permitting the centre ports of each group to receive gas directly from the mains without passing through the ports and the associated metering chambers. The by-pass device may be resettable or an external locking means may be provided to prevent the by-pass being reset to close it after the shaft has been turned to open the by-pass.

It is preferred to provide the cam 16 with a stop arm 19 which prevents the cam being rotated clockwise past the position shown in Fig. 2 in dotted lines in which the valve caps 8 and 9 are fully raised.

The modified form of valve lifting arrangement shown in Fig. 3 may be applied to valves having the general arrangement shown in Fig. 1. In the form shown in Fig. 3 a separate cam 16 is provided for each valve, the cam having a stop arm 19 which prevents it being rotated clockwise past the position shown in Fig. 3 when the valve is raised. The face of the cam which engages under the valve caps 8 or 9 is notched at 16a so that when the valve cap is raised to the position of Fig. 3 the engagement of the under side of the valve cap with the notch 16a prevents the valve being reset to the normal position without first dismantling the meter. It will be appreciated that the arrangement shown in Fig. 3 involves the use of a separate cam for each valve plate. A further possible alternative is to provide a notch in a cross shaft 18 carried by the cam 16 for engagement under the lower face of the valve cap. This is shown in Figure 6. There the cross-bar 18 which engages the valves is notched at 18a. When cam 16 is turned by shaft 17, notch 18a fits over the edge and under the lower face of the valve cap to hold the cap in raised position. It is impossible to reverse the movement of the cam 16 without dismantling the apparatus.

The form of meter shown in Figs. 4 and 5 is of similar general construction to that shown in Figs. 1 and 2 but the sliding valve caps 8, 9 are mounted for rectilinear reciprocation in the direction of the arrows 12, 13, 14, 15, suitable side guides (not shown) and sliding end guides (not shown) being provided to control the movement of the sliding valve caps 8, 9. Projecting portions 8a, 9a of the valve caps house the internal passages. A lifting rod or loop 19a is provided on each valve cap, the under surface of the lifting rod is engaged by a cam 16 carried by a shaft 17. Rotation of the shaft thus causes the sliding valve caps to be lifted and so permits gas from the mains to enter the centre port without passing into and out of the metering chambers associated with the two outer ports.

The external operating means for the forms of lifting arrangement shown in Figs. 1 and 2 or in Figs. 4 and 5 may comprise a sealed chamber in which is located a wheel mounted at the end of the shaft 17 which may be fitted if desired with a non-return ratchet. In Fig. 7 the cam shaft 17 is extended through the meter casing and terminates in a wheel 22 situated within a stationary housing 21, the housing being extended to form a gland housing 20. A pawl 23 pivoted to the wheel 22 engages a stationary ratchet carried by the housing 21. In this way the wheel 22 can be turned to move the cam shaft 17 to raise the valves but it is impossible to return the wheel 22 to its starting position without dismantling the apparatus because of the engagement of the pawl 23 with the ratchet 24. In this way a safeguard is provided against unauthorised use of the by-pass. Alternatively the free end of the shaft 17 may be so shaped as to be engaged by a key. If it is intended that the by-pass shall only be operated by the staff of the gas supply concern, means for preventing of resetting the by-pass may be deemed unnecessary, but where the meter is installed in an industrial plant and the works maintenance engineers are authorised to operate the by-pass in an emergency it may be desired to provide internal locking means as shown in Fig. 3 or external locking means of the character hereinbefore referred to to prevent the by-pass being reset. For domestic supply meters an internal locking device as shown in Fig. 3 is convenient.

I claim:

1. In a dry type gas meter having sliding valves provided with displaceable valve members, means for displacing said members for bringing each outlet port of the valves into direct communication with the meter inlet and by-passing the metering chamber, and normally locked means accessible externally of the meter for actuating said displacing means.

2. In a dry type gas meter as in claim 1, said displacing means further comprising cam means engageable with said valve members.

3. In a dry type gas meter as in claim 2, said valve members further comprising pivoted sliding caps engageable by said cam means.

4. In a dry type gas meter as in claim 1, said displacing means further comprising a lifting bar secured to each valve member, and cam means engageable with said lifting bar.

5. In a dry type gas meter as in claim 1, said valve members further comprising pivoted sliding caps, a cam engageable with each cap, each said cam having a notch for engaging the undersurface of a cap and stop arm means on each said cam for contacting a fixed portion of said meter to prevent further rotation of said cam after said cam has been rotated to raise said cap.

No references cited.